United States Patent [19]

Comerford et al.

[11] Patent Number: 5,117,457
[45] Date of Patent: May 26, 1992

[54] TAMPER RESISTANT PACKAGING FOR INFORMATION PROTECTION IN ELECTRONIC CIRCUITRY

[75] Inventors: Liam D. Comerford, Carmel; Peter G. Ledermann, Pleasantville; Lawrence I. Levy, Yorktown Heights; Steve R. White, New York, all of N.Y.

[73] Assignee: International Business Machines Corp., Armonk, N.Y.

[21] Appl. No.: 471,003

[22] Filed: Jan. 24, 1990

Related U.S. Application Data

[63] Continuation of Ser. No. 927,309, Nov. 5, 1986, abandoned.

[51] Int. Cl.$^5$ .................. H04L 9/00; H02H 7/20; G11B 23/28
[52] U.S. Cl. .................. 380/3; 380/4; 380/52; 380/59; 340/652
[58] Field of Search .................. 380/3–5, 380/59, 52; 342/27–28; 357/74, 80, 85; 307/202.1; 365/228, 244; 340/652

[56] References Cited

U.S. PATENT DOCUMENTS

| | | | |
|---|---|---|---|
| 2,038,878 | 4/1936 | Strutt | 342/27 X |
| 2,197,028 | 4/1940 | Wolff | 342/27 |
| 2,242,246 | 6/1941 | Lindsay et al. | 342/27 X |
| 2,455,376 | 12/1948 | Lindsay | 342/27 X |
| 3,041,592 | 6/1962 | Schmidt | 342/27 X |
| 3,746,863 | 7/1973 | Pronovost | 250/208 |
| 3,763,795 | 10/1973 | Wetz, Jr. | 109/24 |
| 3,825,920 | 7/1974 | Nelson et al. | 340/274 |
| 4,051,472 | 9/1977 | Albanese et al. | 342/28 |
| 4,086,586 | 4/1978 | Spirig | 342/27 X |
| 4,109,233 | 8/1978 | Erickson | 342/27 X |
| 4,120,389 | 10/1978 | Erickson | 342/27 X |
| 4,168,396 | 9/1979 | Best | 178/22 |
| 4,225,859 | 9/1980 | Zetting et al. | 340/566 |
| 4,236,463 | 12/1980 | Westcott | 109/33 |
| 4,382,291 | 5/1983 | Nakauchi | 342/27 X |
| 4,403,138 | 9/1983 | Battarel et al. | 235/487 X |
| 4,459,583 | 7/1984 | van der Walt et al. | 340/589 |
| 4,514,720 | 4/1985 | Oberstein et al. | 340/511 |
| 4,543,565 | 9/1985 | Oberstein et al. | 340/506 |
| 4,562,306 | 12/1985 | Chou et al. | 178/22.08 |
| 4,575,621 | 3/1986 | Dreifus | 235/380 |
| 4,588,176 | 12/1986 | Arnold et al. | 178/22.08 |
| 4,593,384 | 6/1986 | Kleijne | 235/487 X |
| 4,691,350 | 9/1987 | Kleijne et al. | 380/3 |
| 4,783,801 | 11/1988 | Kaule | 380/3 |
| 4,811,288 | 3/1989 | Kleijne et al. | 380/4 X |

FOREIGN PATENT DOCUMENTS

| | | |
|---|---|---|
| 0142013 | 5/1985 | European Pat. Off. . |
| 3023427 | 1/1981 | Fed. Rep. of Germany . |
| 3247260 | 6/1984 | Fed. Rep. of Germany . |
| 0640971 | 1/1984 | Switzerland . |

OTHER PUBLICATIONS

Chaum, David, "Design Concepts for Tamper Responding Systems", Advances in Cryptology/Proceedings of Crypto 83, 1984, pp. 387–392.
Kent, Stephen T., "Protecting Externally Supplied Software in Small Computers", PhD Thesis, M.I.T., 1980.
Price, W. L., "Physical of Transaction Devices", National Physical Laboratory, 1986.
Purdy, George B. et al, "A Software Protection Scheme", IEEE, 1982.
Simmons, Gustavus J., "How to (Selectively) Broadcast a Secret", IEEE, 1985.
The Encryptor Products, Jones Futurex, Inc.
"Secure Terminal Interface Module for Smart Card Applications", IBM Technical Disclosure Bulletin, vol. 28, No. 4, Sep. 1985, pp. 1488–1489.

*Primary Examiner*—Bernarr E. Gregory
*Attorney, Agent, or Firm*—Pollock, Vande Sande & Priddy

[57] ABSTRACT

A tamper-resistant package for protecting information stored in electronic circuitry is described. An energy source provides energy (electrical current, optical energy, microwave energy or RF energy, for example) within a region occupied by the circuitry to be protected. The energy is applied to an energy distribution system comprising a path or paths for energy distribution. Sensing means are provided which respond to the distribution system for sensing an intrusion. The distribution system includes an arrangement for changing or altering the path or paths over which the energy travels or altering the topology of the path or paths. The sensing means is informed of the appearance of the distribution system and senses an intrusion by comparing the appearance of the path(s) with the predicted appearance. In one embodiment, electrical current is selectively applied to a subset of electrical conductors. The pattern of current flowing in the conductors is sensed and compared to an expected pattern which is determined by the subset of energized conductors. Intrusion is evidenced by a disparity between the pattern of energized paths sensed by the sensing means compared to the pattern predicted by the sensing means. Dynamically varying the identity of the energized paths makes it difficult for an attacker to bypass the tamper detection.

25 Claims, 4 Drawing Sheets

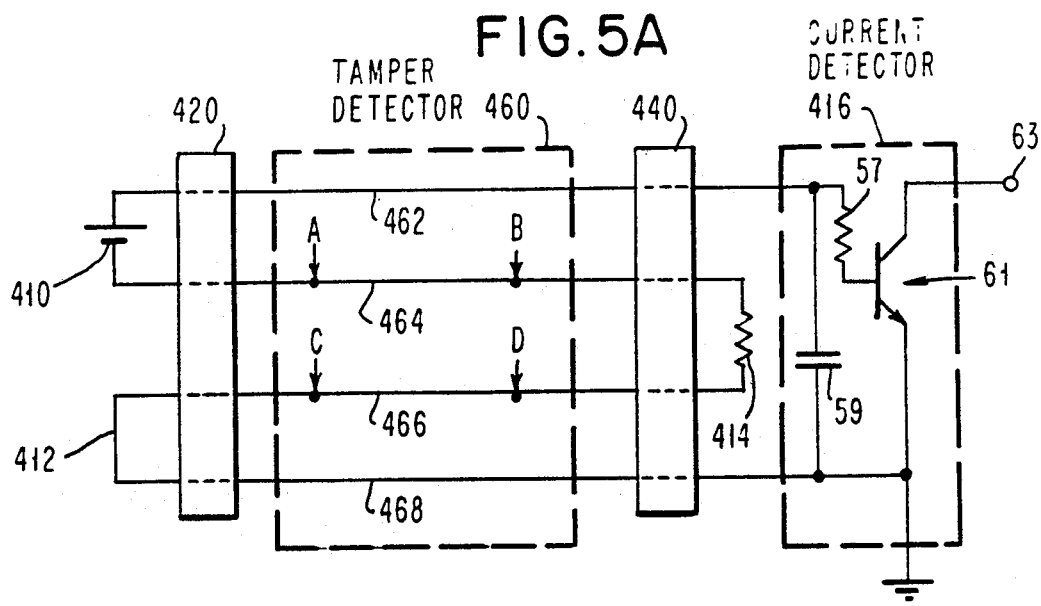
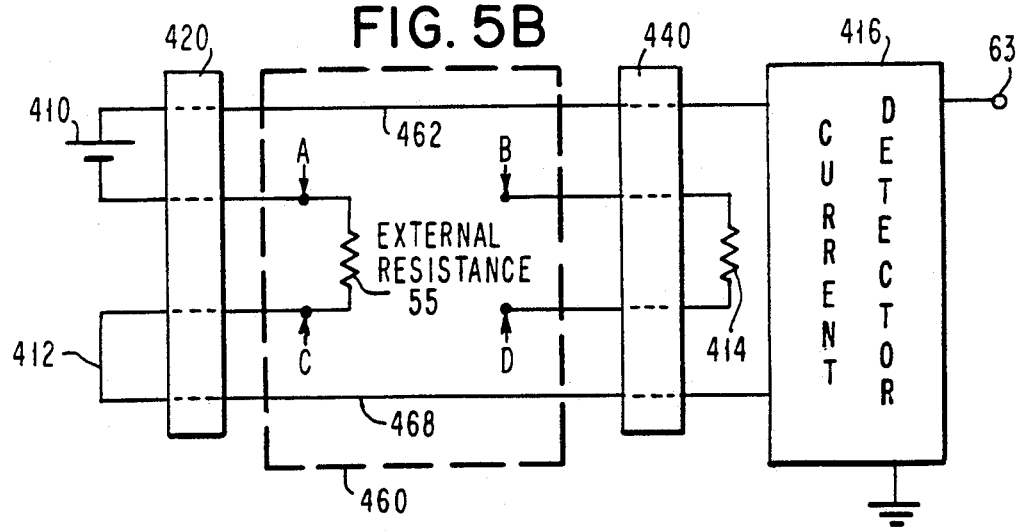
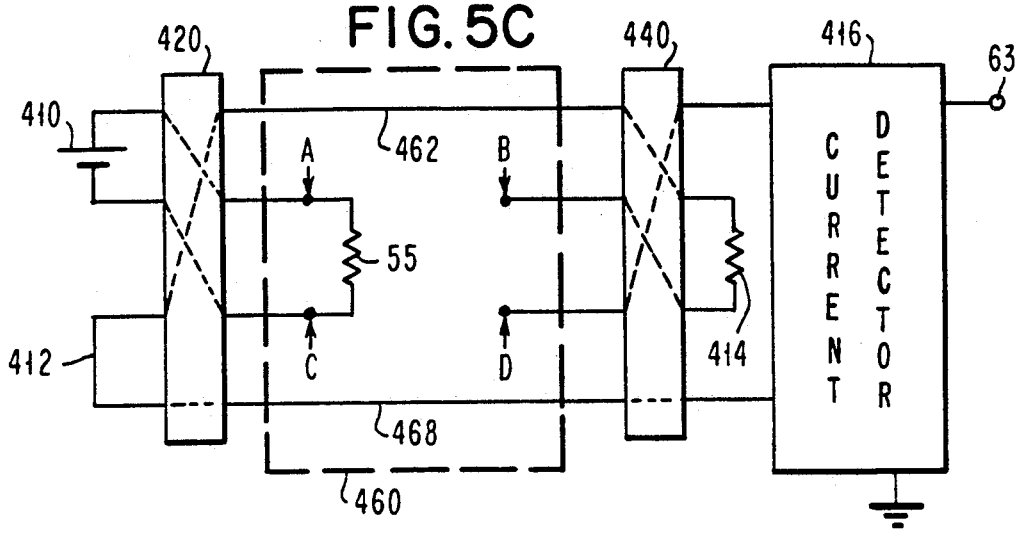

TAMPER RESISTANT PACKAGING FOR INFORMATION PROTECTION IN ELECTRONIC CIRCUITRY

This is a continuation of application Ser. No. 927,309, filed on Nov. 5, 1986, now abandoned.

DESCRIPTION

1. Technical Field

The invention relates to the provision of physical security for information which is electronically stored.

2. Related Application

Copending application Ser. No. 927,629, filed Nov. 15, 1986, now U.S. Pat. No. 4,817,140 discloses a software protection mechanism which in part relies upon the security of information contained in hardware devices. The present invention an be employed to provide the physical security required by the method described in the copending application. Copending application Ser. No. 927,298, filed Nov. 5, 1986, now U.S. Pat. No. 4,860,351, assigned to the assignee of this application, is directed at other features touching on physical security.

3. Background Art

The prior art describes a wide variety of devices to provide physical security to protect objects from unauthorized removal. Generally, such protected objects have macroscopic qualities. One such example is Wetz in U.S. Pat. No. 3,763,795.

For the protection of programs or data contained in machine readable form, the computer industry has traditionally relied on the physical security of the computer installation itself, or that security in combination with legal protection afforded by copyright, contract, trade secret and patent laws. Encryption has been used to prevent unauthorized persons from using intercepted information. In the personal computer area, many different software copy protection schemes are used, but all are based upon one or more software traps of some kind built into the program, and none are effective against the determined pirate.

U.S. Pat. No. 4,471,163 describes a lock identity code which is part of a program lock. To provide security for this information, the patent describes that a circuit board on which the program lock is mounted is enclosed by top and bottom protective plates. Battery power for the components is supplied through a conductor which is glued to the inner surfaces of the protective plates. By this technique, one attempting to gain access to the components on the printed circuit board would necessarily move at least one of the plates. Such movement results in breaking of the power lead to remove power from some of the components. If, as is suggested, the memory storing the information to be protected requires power, this interruption in the power lead would destroy the information that a pirate was seeking and therefore the information would remain protected.

Jones Futurex, Inc., in a brochure describing their "Encryptor" product, describes physical security which is accomplished "by encasing sensitive components that hold the key words in a steel enclosure filled with epoxy." Some of the products such as the "Encryptor 304" include battery support which "not only protects keys in a power failure, but will trigger a self-destruct event if someone tampers with the board. The 304 has a steel/epoxy barrier that prevents direct reading of the keys by logic analyzer or indirect access through electronic signal analysis."

The Jones Futurex brochure, although mentioning tamper protection, provides no teaching as to how that tamper protection is implemented.

The tamper protection provided in U.S. Pat. No. 4,471,163 is of limited utility in that at most it can detect movement of that portion of the upper and lower cover plates which is directly glued to the power lead 49. A determined pirate with access to several such program locks could easily circumvent this protection, although it might mean destroying one or more circuit boards until he had discovered the extent of the protection.

There is a need to provide for security of information rather than objects. The breach in security required to surreptitiously withdraw information may be minuscule as compared to the breach required to withdraw a physical object. Hence the security provisions for information may be different in kind from that required to protect objects.

It is conceivable that an attack on a device or installation to obtain information may be mounted in several stages:

1) Removal of encapsulant or encapsulant and covers,
2) Identification of location and function of security sensors,
3) Bypassing of sensors to allow access to the next layer of protection, and so on.

Use of such carefully directed techniques (which can be likened to brain surgery) could, given sufficient time and resources, defeat existing protection systems such as that described in Wetz in U.S. Pat. No. 3,763,795.

It is therefore an object of the invention to provide security against physical attack for information as opposed to security for physical objects or devices. It is a particular object of the invention to provide security for information which may be recorded or stored in an electronic device. It is another object of the invention to provide security which is exceedingly difficult to penetrate even if the attacker is aware of the architecture of the protection mechanisms.

SUMMARY OF THE INVENTION

Accordingly, the invention provides a tamper resistant or intrusion resistant package for protecting information stored in an electronic circuit. The package includes an enclosure or boundary space which substantially surrounds the electronic circuit to be protected. An energy source is provided to apply some form of energy (e.g. electrical current, optical energy, microwave energy or rf energy) to the enclosure. An energy distribution system, comprising a path or paths for energy distribution, is coupled to the energy source. Sensing means are provided, responsive to the distribution system for sensing an intrusion or an attempted intrusion. The distribution system includes an arrangement for changing or altering the path or paths over which the energy travels or altering the topology of the path or paths; in general the arrangement alters the appearance of the distribution system. The sensing means is informed of the appearance of the distribution system and senses an intrusion by comparing the appearance of the path(s) with the predicted appearance; any substantial difference is evidence of an intrusion. An impairing means may be provided which is responsive to the sensing means for impairing the electronic circuit in the presence of an intrusion. In order for the sensing system to be able to detect variations in the appearance of the distribution system it may require some a priori information relating to the distribution system appearance. For example the enclosure may be subjected to the energy for each possible appearance or topology and the response of the sensor recorded as the predicted appearance, or the transfer function of the enclosure for each possible appearance or topology, can be measured or computed and recorded. At selected times (or continuously) energy is applied to the enclosure and the actual response of the sensing means is compared to the expected response. In summary, the tamper detection system consists of a path for the transmission of energy (substantially surrounding the protected information containing circuit), means for changing the topology or appearance of that path, means for determining the actual appearance or topology of that path, and means for responding to correspondence or lack of correspondence of the path with its predicted appearance or topology, and the continuous performance of a cycle of change, test, and compare, using these components in order that efforts to tamper with the enclosure which involve means for misleading the system about the intact state of the paths must be able to track the possibly random and rapid changes in the topology or appearance of the paths or be detected by the failure to do so.

In accordance with an aspect of the present invention, information which may be stored in the form of a CMOS RAM or other power requiring memory is protected from unauthorized access by surrounding it with a physical boundary space filled with or including one or more non-touching or insulated conductors following a complex path. The conductors in the boundary space are used to electrically sense any physical intrusion into this boundary space. The density of the conductors is made sufficiently high and the conductors are made sufficiently fragile so that any physical intrusion into the boundary space will cause either a short between two conductors or a break in one or more conductors. An opaque encapsulant is used to support the conductors, which encapsulant facilitates breaking the conductors in the event of an intrusion. If a short circuit or conductor break occurs, circuitry within the protected region senses the intrusion to immediately destroy the information being protected. For example, the conductors which have already been referred to in the boundary space might themselves carry the current necessary for maintaining the storage states of volatile memory elements. Accordingly, the breaking of conductor automatically obliterates the stored information. However, the conductors need not themselves carry the current necessary to maintain volatile memory, but can merely be employed to sense an intrusion, triggering a change in the supply of power to such volatile memory. The tamper resistant package may be enhanced so as to foil any attempt at probe guidance by use of imaging equipment using light, x-rays, sound, etc.

In accordance with one particular embodiment of the invention, the boundary space is defined by at least one substantially planar board or card which has a first side coated with a conductor and a second side on which exists a pattern of fine conductors. The sensing means includes an electrical circuit which is formed at least in part by the conductor coating and at least in part by at least some of the fine conductors. In this embodiment the fine conductors can represent both the sensing and impairing means if they themselves carry current to support volatile memory. In another embodiment the fine conductors represent only the sensing means, and the impairing means includes other conductors supplying current to support volatile memory. The first side of the board is coated with a conductor to inhibit probing the card structure with x-rays and to provide shielding to the sensor circuitry.

It is by no means essential for the intrusion sensing to be electrical. Optical propagation paths or a microwave or other rf energy can be substituted for the electrical conductors.

In any case (current conduction, optical propagation, microwave or rf energy) all paths could be in use and the disturbance of any path triggers an intrusion, alternatively some paths could be energized and others deenergized and the pattern of energized and deenergized paths determines the existence of an intrusion. The path selection could be variable from package to package and could be dynamically variable within a single package. Rather than disturbing predetermined voltage patterns through open or short circuits, sensing the disturbance of an optical propagation path can be used to sense an intrusion. Such disturbance could be caused by physically disturbing an optical propagation path.

The use of dynamically variable patterns of active and passive paths allows the presence of a disturbance or intrusion to be detected by sensing the actual pattern of conduction and comparing it to the expected pattern. An active path may be deactivated by a disturbance or intrusion opening or breaking an active path. A passive path may become active by being shorted to, or having energy reflected therein from, an active path. Dynamically variable patterns preclude an intruder from merely bypassing the active paths. If this were effected, the intrusion would be detected as soon as the pattern was altered. In general, these embodiments of the invention rely on a query/response arrangement; a condition or pattern of active/passive paths is established, the response is sensed or detected, the detected condition or pattern is compared with the condition or pattern established in the first step, and the protected information maintained if the conditions or patterns correspond. In the absence of some intrusion, the security system can predict the response, i.e. active paths should be sensed as active and vice versa. Intrusion is sensed when the system response is different from the predicted response.

Another example of a dynamically variable path may be derived from the foregoing version. In this version, the conductive paths are arranged on a mechanical arm. This arm is arranged to be moved by a motor so that the boundary of the protected space is substantially swept by the arm. The path is dynamically varied by randomly changing the motor speed and direction so that the position of the arm is not predictable by an attacker. The circuit driving the motor is arranged so that an effort to slow or stop the arm can be sensed. This can be achieved by optically encoding the motor armature position or by sensing the motor back voltage. These are both conventional techniques. The circuit driving the motor predicts the motor position on the basis of the random drive signal. The predicted path can be compared with the actual result. An attempt to sever the arm would be sensed by the conductive paths on the arm. Mechanical energy may thus be considered among the forms which are useful in this system.

Accordingly, in another aspect, the invention provides a tamper resistant apparatus for detecting intrusion into a region, comprising:

means for changing a condition of said region to any one of a plurality of conditions; and means for sensing predictable results for said changing conditions assumed by said region when there is no intrusion into said region, and detecting intrusion into said region when other than said predictable results are sensed.

BRIEF DESCRIPTION OF THE DRAWINGS

The present invention will now be described in the following portions of the specification when taken in conjunction with the attached drawings in which like reference characters identify corresponding apparatus and in which:

FIGS. 4 and 5(a)-5(c) show an alternative system of distribution and sensing.

DETAILED DESCRIPTION OF PREFERRED EMBODIMENTS

Figure 1:
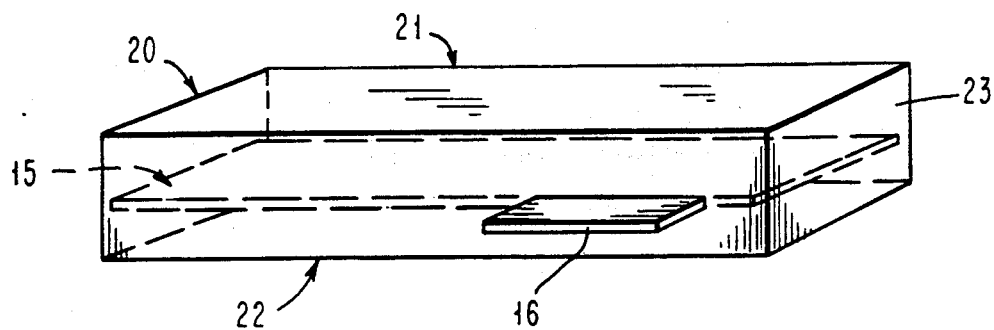
FIG. 1 is a view of a package in accordance with the invention wherein card 15 includes a circuit to be protected by the enclosure defined by the walls 21, 22.

For information which is electronically stored, e.g. in RAM, the problem posed to those attempting to protect the information is rendered difficult by the inability to predict by what means an attacker would use to attempt to gain access to the information. However, if we can confine the attacker to one or several points of access, then we can concentrate our resources in protecting the few exposed access paths. For information which is stored electronically, and which is to be so used, it or some derivative thereof must be capable of being communicated in the form in which it is stored to the outside world. Typically, this capability is implemented as a series of conductive pins or the like. It is the purpose of the present invention to ensure that the information which is electronically stored is available in no other fashion regardless of the ingenuity of an attacker. That is to say that the attacker is unable to create a new set of pins through which unauthorized access can be made to the stored information. Protection of access to information via the package pins or terminals requires logical security which is not within the purview of the invention. FIG. 1 shows an enclosure 20, formed by top wall 21, and a bottom wall 22 within which a card 15 on which is mounted the electronic circuit or circuitry in which is stored the information to be protected. If the walls 21, 22 are planar, side walls may also be necessary to complete the enclosure 20; however the walls 21, 22 need not be planar and therefore side walls are not essential. The electronic circuitry is coupled to a connector 16, so that the information or a derivative thereof can be communicated to the outside world. It is thus the purpose of the invention to ensure that the information which is contained on the card 15 is inaccessible by any other means. The electronic circuitry may take on a variety of levels of complexity from a simple device such as a few stages of shift registers and associated logic to more complex devices such as a microcomputer or even a mainframe computer.

One of the goals of the invention is to ensure that the information stored on the card 15 cannot be accessed by removing the card from the enclosure 20. That is, while it may be possible to physically remove the card from the enclosure 20, by the time the card is removed from the enclosure 20, it no longer contains, at least in usable form, the information which the attacker sought to obtain.

In accordance with one embodiment of the invention, the enclosure 20 includes a conductor or conductors which follow a complex path so as to largely fill or at least substantially surround the volume of the enclosure 20. The conductor or conductors contained within the volume 20 are used as a sensor. By making the density of the conductors sufficiently large, and the conductors themselves sufficiently fragile, any material intrusion into the volume is likely to cause a short circuit between conductors or an open in one or more of the conductors. Because the conductors are preferably relatively fragile, to ensure the integrity of the device in the absence of an intrusion, we provide a support for the conductors. The supporting material is chosen so that it increases the likelihood of an open or short on intrusion while providing integrity in the absence of an intrusion. In addition, one of the goals of the invention is to thwart attempts at gaining access to the stored information by means of creating an electronic device with properties that mimic those of the sensor, so that this device may be substituted for some region of the sensor without being detected, so that the substituted region of the sensor may be removed, so that the underlying circuitry may be revealed and the information contained therein be removed or copied or altered.

In an inexpensive embodiment, the volume 20 is enclosed within upper and lower cards 21, 22 which may be epoxy glass. The epoxy glass cards 21, 22 have a pattern of fine conducting lines (formed by standard etching processes) on inside surfaces (on the surfaces closer to the card 15). The still largely unfilled space between the cards 21, 22 is then filled with a black silicone encapsulating material (or other equivalent material). The outward facing sides of the cards 21, 22 have a continuous copper (or other conductor) coating which serves to provide shielding for both the card to be protected as well as the lines on the interior surface of the protection cards 21, 22. This sensing arrangement is electrically interconnected to the card 15 which carries the circuitry containing the information to be protected and the circuitry which controls retention of that information. Such electrical interconnection can be provided by means of a plurality of metal pins distributed on the inside of the protection cards 21, 22 and projecting toward the card 15. These pins provide for mechanical support of the protection cards during manufacture as well as providing physical security by making it difficult to remove a card without breaking the conducting lines and thereby triggering some protective reaction.

Figure 2:
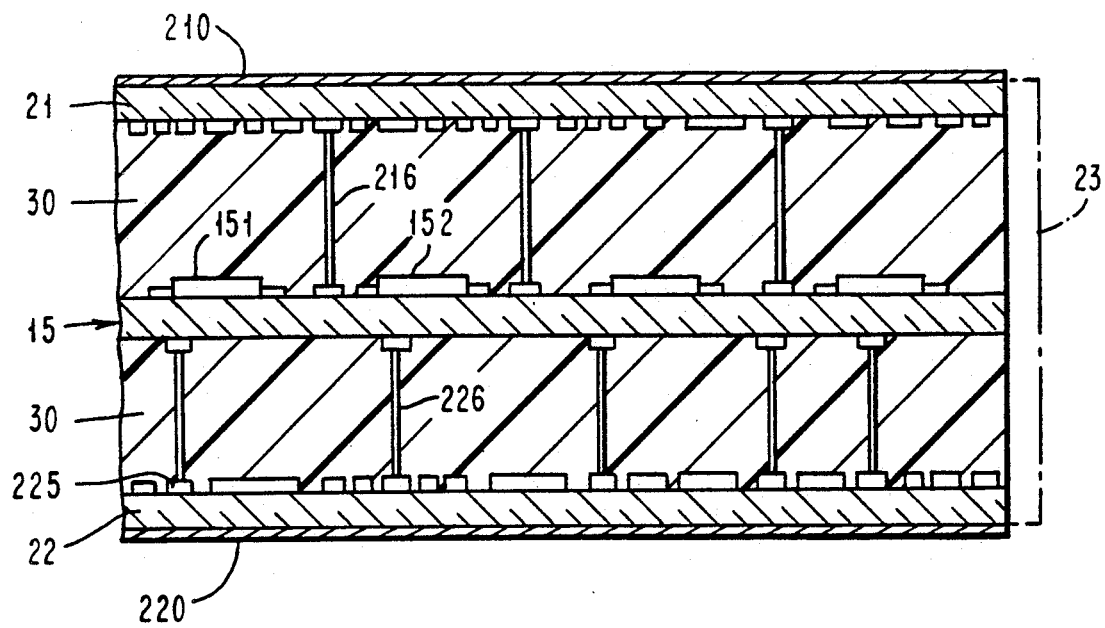
FIG. 2 is a cross-section of FIG. 1 showing, in detail the card 15, the circuits supported thereby, the walls 21, 22 and the various conductors supported thereby.

FIG. 2 shows a board 15 on which a plurality of electronic circuits 151-153, etc. are supported. The cards 21 and 22 are arranged on either side of the card 15 to form an enclosure as seen in FIG. 1. The cards 21, 22 then substantially surround the card 15. The outer surfaces of the cards 21, 22 have a conductive coating 210, 220 such as copper. On the inside surfaces the cards 21, 22 have a fine pattern of conductors 215, 225 deposited thereon. Pins 216, 226 are selectively located to interconnect the pattern of conductors 215, 225 to circuitry on the card 15. In this embodiment the pattern of conductors on the cards 21, 22 follow a complex path and substantially surround the volume containing the circuits 151–153 to be protected.

In one embodiment of the invention power for CMOS RAM chips (such as 151, 152, etc.) is carried by at least some of the conductors 215, 225 and coupled to the RAM chips by at least some of the pins 216, 226. Physical movement of the cards 21, 22 or the conductors thereon 215, 225 or the pins 216, 226 will interrupt the supply of power to the RAM chips 151, 152 to thereby obliterate or at least alter the contents of that memory.

In accordance with another embodiment of the invention, the printed circuit conductors 215, 225 and the associated pins 216, 226 do not supply power to the memory chips 151, 152, etc., rather the foregoing circuitry is used to control the delivery of power to the RAM chips. In accordance with this embodiment of the invention, the conductive pattern 215, 225 is divided into several isolated paths through which a sensing current may or may not be passed. Not all of these paths need be used at any one time and the pattern of paths which are actually used can be dynamically selected by circuitry which is built for this purpose and for example supported on the card 15. An embodiment of that circuitry is shown in block diagram form in FIG. 3. If the pattern of sense current delivery circuits actually carrying current fails to match the patterns set by the power control circuitry (selector and distributor of FIG. 3) then that circuitry powers down and crowbars the RAM chips destroying the contents.

Figure 3:
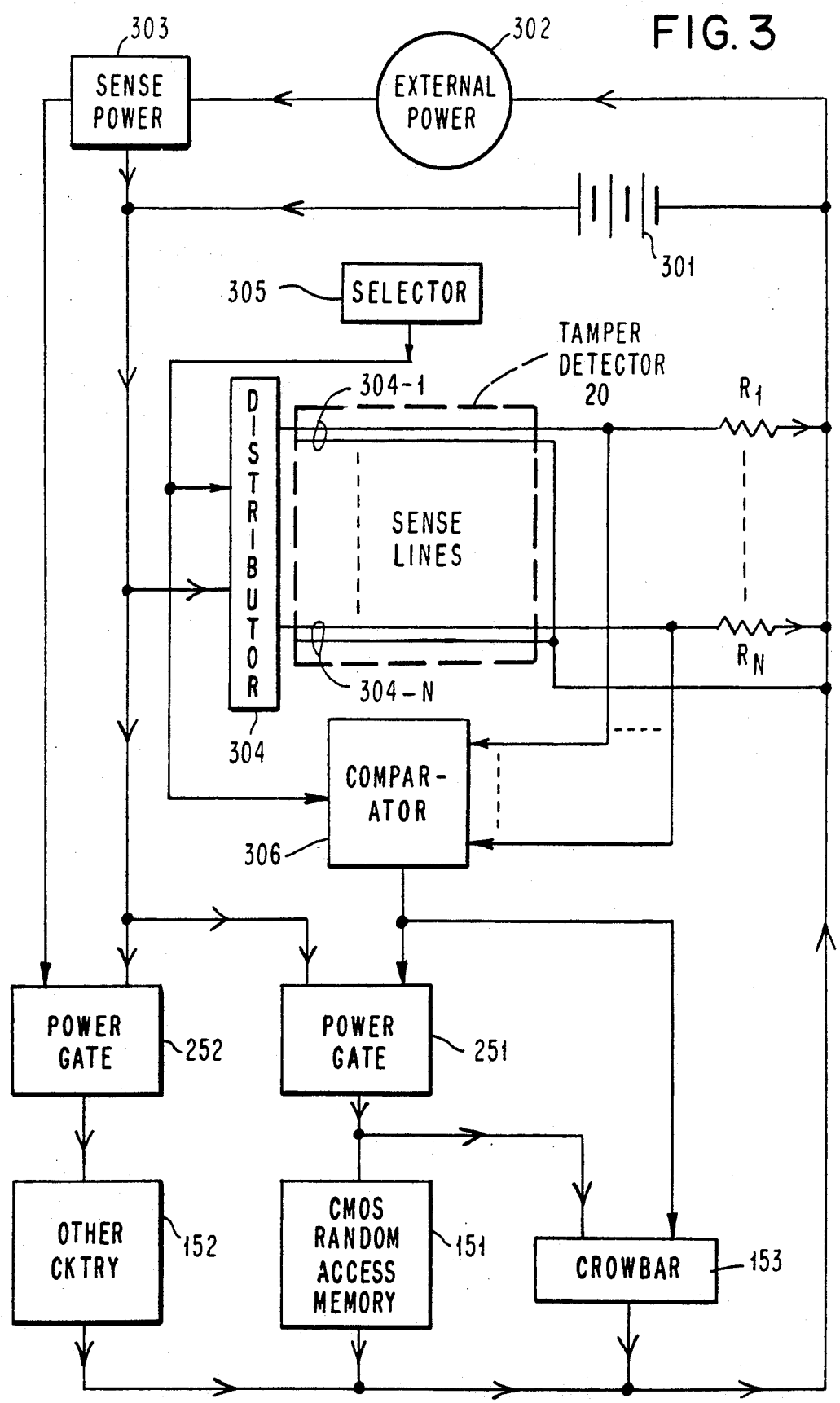
FIG. 3 is a schematic of intrusion sensing and impairing circuitry in accordance with an embodiment of the invention.

As shown in FIG. 3, a battery 301 and/or other conventional power supply 302 are provided to supply power to a CMOS RAM 151 and other circuitry 152. A conventional power sensing element 303 is used to turn on power through power gate 252 to components which are not part of the protected memory or protection circuitry in the event that external power is supplied. This would be the case when the system was turned on for use. The CMOS RAM 151 is provided with a power gate 251 which under certain circumstances can allow power to flow to the associated CMOS RAM 151. The circumstances under which the power gate 251 will allow power to be conducted to the associated circuitry is now described.

A distributor 304 is arranged to selectively energize one or a group of sense lines 304-1 through 304-n. Different ones of these sense lines are formed by different patterns of conductors 215, 225 and the associated pins 216, 226. While all of the sense lines could be energized by the distributor 304, its presence allows less than all of the sense lines to be energized. The sense lines which are energized are changed as a function of time. The distributor 304 is controlled by a selecting element 305 to determine which of the plural sense lines are actually energized at any time. The select element 305 can be implemented in a variety of forms. It can be dynamic in that the selection of the sense lines which will be energized can change as a function of time, or any other parameter that the select element 305 can respond to. In its dynamic form the select element 305 generates a series of drive signals, changing as a function of time. Each drive signal is a composite to control each of the sense lines 304-1 through 304-n. A compare element 306 receives two sets of inputs; a first type of input to the compare element 306 is derived from the output of the select element 305 and identifies the sense lines of the distributor 304 which are energized. Each of the sense lines 304-1 through 304-n includes a sensing resistor such as R1, . . . Rn, so that when current flows through a particular sense line, a corresponding voltage is developed across the associated resistor. For sense lines which do not conduct current of course no voltage should be developed across the resistor. The compare element 306 includes an input from each of the sensing resistors. The compare element 306 then compares the identity of those sense lines which should be conducting current (information derived from the select element 305) with those sense lines which are actually conducting current (from information provided by the voltages sensed across the resistors). Only if the two patterns match identically does the compare element 306 allow the power gate 251 to conduct power to the RAM 151. In this way, the compare element 306 can determine that every sense line that should be conducting current is conducting current (thus assuring that none of the patterns has developed an open circuit because of an intrusion for example) and that none of the sense lines which should not be conducting current are conducting current (as they might be if an attempted intrusion has resulted in a short circuit between one of the sense lines which has been commanded to conduct current with one of the sense lines which has been commanded not to conduct current) or in the case that an attacker has intentionally bridged equipotential lines to make room in which to work.

While the apparatus of FIG. 3, as just described, includes a selector element 305 which dynamically alters the distribution or pattern of energized and deenergized paths, it is within the scope of the invention to provide a tamper resistant package in which the selectors 305 are not dynamic; as a function of time they are static. Rather, in a simpler embodiment different ones of the packages have different selectors 305. Accordingly, in a first package, a first selector 305 establishes a first pattern of energized and de-energized paths, in a second package a second selector 305 establishes a different pattern of energized and de-energized paths. Thus in any package the pattern of energized and de-energized paths is constant, but an attacker cannot employ information learned in attempting to breach one package, to assist him in attempting to breach another different package. This is true even though there may be thousands of packages having an identical pattern of energized and de-energized paths.

In an even still simpler embodiment of the invention, the selector 305 is static, and all packages have the same pattern of energized and de-energized paths.

Figure 4:
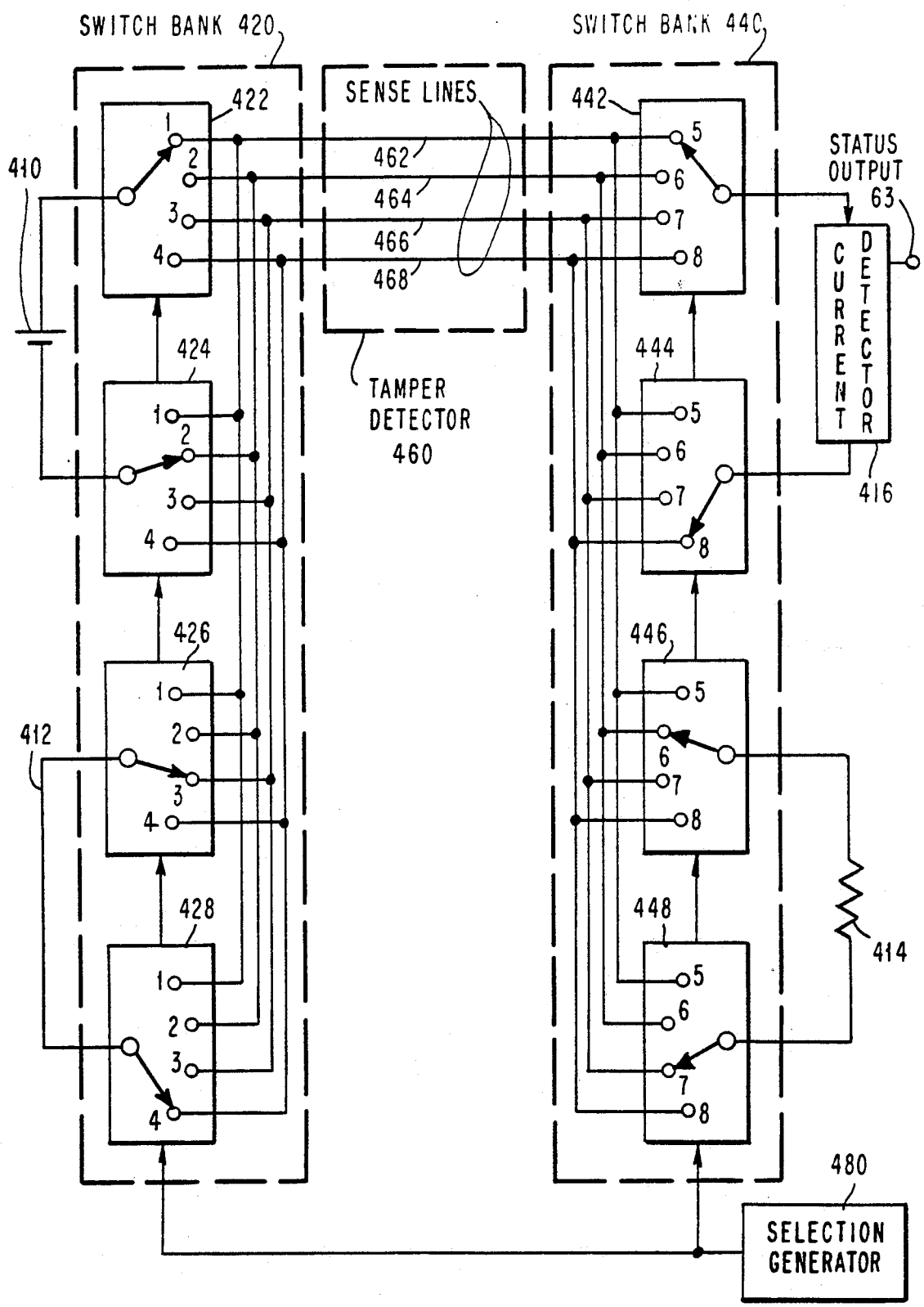

An alternative system of distribution and sensing is shown in FIGS. 4 and 5(a)–5(c). FIG. 4 shows a circuit in which a pair of switch banks 420 and 440 control the position in the detection system which is occupied by the sense lines 462, 464, 466 and 468 which compose the conducting paths within the tamper detector 460. The "positions" of the switches 422, 424, 426, 428, 442, 444, 446, 448 within the switch banks are controlled by the selection generator 480 via the drive signals from selection generator 480 to the switches 422, 424, 426, 428, 442, 444, 446 and 448. It is to be understood that in any real embodiment, the switches will be electronic devices such as CMOS analog gates and that the selection generator will be designed so that all selections controlling the switch "positions" will configure useful arrangement of the sense lines. This may be accomplished either by recording all useful arrangement or by generating them algorithmically. In either case the methods needed in such a generator are obvious to those skilled in the art of digital design. Any useful arrangement of the sense lines will cause a complete circuit to be formed so that current from the current source 410 will flow through an internal jumper 412, a load resistance 414, and a current detector 416. It should be understood that a tamper detector 460 consisting of four lines is shown only for the sake of simplifying explanation of the system function. More lines could be used in any real embodiment. It should also be understood that the length of these lines is sufficient to fill the requirement that the tamper detector substantially fill the space which surrounds both the information containing circuitry and circuitry which configures and reads the tamper detector. It should also be understood that the circuit components (current source 410, jumper 412, load 414, and current detector 416) may be replaced by a wide variety of matched sets of components including any usable form of signal source and detector, and that current is used in this example only for the purpose of simplification of the description.

FIGS. 5A, 5B and 5C show the events which may occur in an attack on this tamper detector which is mounted with the object of removing some large fraction of the detector by substituting a circuit with the same electronic properties as the removed section. In FIG. 5A the tamper detector is configured identically to FIG. 4. The attacker has exposed widely separated points A, B, C and D, by carefully removing the material in which the lines are encased. By means of conventional electronic techniques it is possible to determine that the sub-circuit containing the four points may be replaced by an external resistance 55 of appropriate value. The attacker may substitute this resistance as shown in FIG. 5B in a time period too short to be detected by the current detector 416. The current detector shown consists of a one transistor invertor of conventional design with an "L" section low pass filter at its input so that the transient absence of current at the time the switch banks change state will not cause the protected information to be erased. FIG. 5C shows the configuration of the system after switch banks 420 and 440 have changed state (as may happen at any time). In the new configuration the external resistance no longer effectively substitutes for the area of the detector which has been removed hence the intrusion is detected by the lack of current flow in the current detector, and is indicated by the change in state of the status output line.

The net effect of the ability of this system to detect attack by substitution is to limit the attacker to the tedious, accident sensitive, exacting attack of line by line substitution. This attack is thwarted by the correct construction of the tamper detector or by use of this system in conjunction with a more conventional measurement system which could detect the cumulative changes in the electronic properties of the individual lines as substitutions are made.

The current detector shown consists of a one transistor invertor of conventional design with an "L" section low pass filter at its input so that the transient absence of current at the time the switch banks change state will not be misinterpreted as an attack and cause the protected information to be erased. In this circuit, the steady state potential which appears across the capacitor 59 after it has charged, is set by the voltage divider formed by the resistors 57 and 414 and the potential across both the current source 410 and the emitter-base junction of the transistor 61. The values of components used in the circuit are chosen so that this potential is more than enough to cause the current flow through the emitter-base junction of the transistor 61 to cause the transistor 61 to conduct strongly. In addition to dividing the voltage across the current sensor, the resistor 57 is chosen so that the time constant for the discharge of the RC circuit consisting of the emitter-base junction of transistor 61 and capacitor 59 and resistor 57 is sufficiently long that the transistor 61 will continue to conduct strongly even during the short periods when the current sensor is disconnected from the remainder of the circuit as the switch banks 420 and 440 reconfigure the circuit. The direct consequence of the transistor 61 being in a strongly conducting state is that the potential at the status output terminal 63 connected to the collector of the transistor 61 is close to the ground potential to which the transistor 61 emitter is connected. If this circuit is connected to a conventional TTL logic circuit, the state of the status output would be interpreted by that circuit as a logic level "zero". A circuit using this status output should interpret this level as indicating an untampered state. In the event that the flow of current through the circuit is interrupted for more than the switching period, as would be the case in FIG. 5C, the discharging capacitor 59 will soon be unable to supply the current needed to keep the transistor 61 in a conductor state. When this happens, the status output 63 will no longer be close to ground potential. This change in state will be interpreted by a conventional TTL circuit as a logic level "one" which should be taken as an indication that tampering has been detected. The circuit described can easily be improved upon by one skilled in the art to include other detection capabilities such as detection of over-voltage conditions or detection of circuit resistance changes. This circuit is only intended to illustrate the principles of operation of such a system.

Attempts at breaching the card security by inserting probes in from the side of the card is made difficult by the difficulty of routing a probe accurately through the encapsulating material 30 and by the length and narrowness of that path. Alternatively, the path could be covered by sensors. Positioning assistance with guidance equipment such as x-ray or sound is not possible because of the sensitivity of the RAM to x-rays and the difficulty of acoustic imaging through the silicone.

A random vertical distribution of conducting lines resulting from a textured surface could render mechanical milling or plasma etching difficult. That is, distributing the lines so that different portions of a single path lie in different horizontal sections makes the use of plasma etching or mechanical milling unavailing to the intruder.

Multiple designs with electrically identical function but different conductor position would serve to thwart repeated attempts by making data obtained by disassembling cards less likely to be useful when attacking other cards.

In an optical analog to the embodiment of FIGS. 2/3, the electrical supply is replaced by an optical source, the sense lines 215/216 are replaced by free optical paths, the distribution function is replaced by optical scanning, and the resistors $R_1$-$R_n$ are replaced by photo sensitive devices. Intrusion is detected by lack of optical energy at a particular photo sensitive device because an intruding object has broken an optical path or by the presence of optical energy at another device produced by reflection off an intruding object.

It should also be apparent that the opaque encapsulant must be omitted or channeled to provide a free space propagation path for optical energy. In the case of free or guided optical propagation a single source (such as a laser diode) can supply or drive multiple optical paths, each with a dedicated photo responsive diode or the like. Energized/deenergized paths may be selected by blocking access from the source to selected paths or by redirecting the optical source. Alternatively, multiple optical sources can be selectively energized/deenergized.

From the foregoing, it should be apparent that many changes can be made to the various embodiments specifically described herein without departing from the spirit and scope of the invention which is to be determined from the attached claims.

Having thus described our invention, what we claim as new, and desire to secure by Letters Patent is:

1. A tamper resistant apparatus for detecting intrusion into a region comprising:
   an enclosure being part of and substantially surrounding said region;
   energy distribution means including a plurality of paths, each supporting energy distribution, means for changing the condition of the region to any one of a plurality of different conditions by selecting certain of said paths to carry energy and selecting others of the paths not to carry energy;
   means for sensing predictable results for said conditions assumed by said region when there is no intrusion into said enclosure and detecting intrusion into said enclosure when results other than said predictable results are sensed, wherein:
   said means for sensing predictable results comprises means for sensing the presence and absence of energy on said paths and where an intrusion is detected based on the presence and absence of energy on said paths.

2. A tamper resistant apparatus for protecting information stored in an electronic circuit comprising:
   an enclosure being part of and substantially surrounding a region containing said electric circuit;
   energy distribution means including a plurality of paths, each supporting energy distribution, means for changing the condition of the region to any one of a plurality of different conditions by selecting certain of said paths to carry energy and selecting others of the paths not to carry energy;
   means for sensing predictable results for said conditions assumed by said enclsoure when there is no intrusion into said enclosure, and detecting intrusion into said enclosure when results other than said predictable results are sensed, wherein said means for sensing predictable results comprises means for sensing the presence and absence of energy on said paths and where an intrusion is detected based on the presence and absence of energy on said paths; and
   impairing means for impairing said information contained in said electronic circuit when intrusion is detected by said sensing means.

3. The apparatus of claim 1 or 2 in which said enclosure includes at least one board including a first side coated with a conductor and a second side including a pattern of fine conductors; and
   said means for sensing includes an electrical circuit formed at least in part by said conductor coating and at least some of said fine conductors.

4. The apparatus of claim 1 or 2 in which said enclosure includes a plurality of conducive elements and in which said means for sensing is coupled to said conductive elements to sense an intrusion by a change in the conductive relationship among at least some of said conductive elements.

5. The apparatus of claim 1 or 2 which includes a source of optical energy, at least one photodetector and an optical path therebetween.

6. The apparatus of claim 5 wherein said optical path is a free space path.

7. The apparatus of claim 1 or 2 wherein said means for changing and means for sensing includes:
   means for generating and distributing electro-magnetic energy within said enclosure;
   energy response means for detecting said electromagnetic energy; and
   means for comparing an output of said energy response means with a predetermined reference to detect an intrusion.

8. The apparatus of claim 7 wherein said means for generating and distributing includes selector means for varying the distribution of said energy at different times.

9. The apparatus of claim 8 in which said selector means produces an output identifying said distribution and means responsive to said output for generating said predetermined reference.

10. The apparatus of claim 8 in which said electromagnetic energy is electrical current.

11. The apparatus of claim 8 in which said electromagnetic energy is optical energy.

12. The apparatus of claim 8 in which said electromagnetic energy is microwave energy.

13. The apparatus of claim 1 or 2 wherein said means for sensing includes a source of mechanical energy.

14. The apparatus of claim 2 in which said electronic circuit comprises a CMOS chip and in which said impairing means interrupts electrical current flow to said CMOS chip.

15. The apparatus of claim 4 in which said enclosure includes at least one board including a first side coated with a conductor and a second side including a pattern of fine conductors;
   said means for sensing includes an electrical circuit formed at least in part by said conductor coating and at least some of said fine conductors, and wherein at least a part of said electrical circuit is connected in series with said impairing means.

16. The apparatus of claim 2 in which said enclosure includes at least one board including a first side coated with a conductor and a second side including a pattern of fine conductors; and
   said means for sensing includes an electrical circuit formed at least in part by said conductor coating and at least some of said fine conductors, wherein said means for changing includes a select means for selectively energizing only a first group of said fine conductors, wherein said means for sensing includes means for detecting current flow in said first group of said fine conductors and fine conductors not in said first group, to provide an output indication of those conductors supporting current flow and those conductors not supporting current flow;
   means for comparing said output indication of said means for detecting with an output of said select means identifying said first group of conductors, and means coupling an output of said first means for comparing to said impairing means to impair said electronic circuit in the event said output of said means for comparing indicates that some of said fine conductors in said first group are not supporting current flow or some of said conductors not in said first group are supporting current flow.

17. A tamper resistant apparatus for detecting intrusion into a region comprising:
   (a) means for generating a time sequence of drive signals;
   (b) a plurality of sensing elements surrounding the region, the sensing elements responsive to a current one of said drive signals for assuming, in absence of intrusion, a particular state in conformity with the current one of the drive signals;
   (c) means for comparing an actual pattern of states of said sensing elements with a pattern of states predicted from the currant drive signal; and
   (d) means for detecting intrusion into said region when the actual pattern of states does not match the predicted pattern of states.

18. The apparatus of claim 17 wherein said region includes an electronic circuit and which further includes impairing means to impair said electronic circuit in response to sensing of intrusion by said detecting means.

19. The apparatus of claim 17 wherein said sensing elements comprise electrical conductors assuming either a current conducting state or a current non-conducting state.

20. The apparatus of claim 17 wherein said sensing elements include an optical source, a photodetector and an optical path therebetween.

21. The apparatus of claim 20 wherein said optical path is a free space path.

22. The apparatus of claim 17 wherein said means for sensing includes:
   b1) means for generating and distributing electro-magnetic energy,
   b2) energy response means for detecting electro-magnetic energy,
   and wherein said means for comparing compares states of said energy response means with said pattern of states predicted from said current drive signal.

23. The apparatus of claim 22 in which said electromagnetic energy is electrical current.

24. The apparatus of claim 22 in which said electromagnetic energy is optical energy.

25. The apparatus of claim 22 in which said electromagnetic energy is microwave energy.

* * * * *

UNITED STATES PATENT AND TRADEMARK OFFICE
CERTIFICATE OF CORRECTION

PATENT NO. : 5,117,457

DATED : May 26, 1992

INVENTOR(S) : Comerford et al

It is certified that error appears in the above-identified patent and that said Letters Patent is hereby corrected as shown below:

Col. 11, line 68, "conducive" should be --conductive--.

Signed and Sealed this

Fourteenth Day of September, 1993

Attest:

BRUCE LEHMAN

Attesting Officer

Commissioner of Patents and Trademarks